United States Patent [19]
Kenigsberg

[11] Patent Number: 5,928,582
[45] Date of Patent: *Jul. 27, 1999

[54] MICROPOROUS MEMBRANES, METHOD OF MANUFACTURE

[75] Inventor: Issac Kenigsberg, Petach Tikva, Israel

[73] Assignee: Xenon Research, Inc., Lake Mary, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/618,838

[22] Filed: Mar. 19, 1996

[51] Int. Cl.⁶ .................................................. B24C 65/00
[52] U.S. Cl. .............................. 264/41; 264/344; 521/63; 521/64; 521/50.5
[58] Field of Search ..................... 264/41, 344; 521/63, 521/64, 50.5

*Primary Examiner*—James J. Bell
*Attorney, Agent, or Firm*—Cantor Colburn LLP

[57] ABSTRACT

A microporous membrane and method of manufacture is presented utilizing irradiation and thermal induction phase separation techniques. During manufacture, microsphereulites are created by irradiation of curable agents in a casted polyolefin film. The microsphereulites then serve as nucleating agents in a thermally-induced phase separation step, providing a microporous membrane with improved flow and mechanical properties.

14 Claims, 2 Drawing Sheets

MICROPOROUS MEMBRANES, METHOD OF MANUFACTURE

BACKGROUND OF THE INVENTION

1. Field of the Invention

The present invention relates to an improved microporous membrane and method of manufacture. Microporous as used herein refers to pore sizes in the range from $1\times10^{-2}$ to 10 microns in diameter. Specifically, the present invention relates to a membrane formed by a process of ultra violet irradiation to form microsphereulites, followed by thermally-induced phase separation, yielding microporous membranes that have improved flow and mechanical properties.

2. Prior Art

Microporous membranes have an open-cell, sponge-like structure, as shown in FIG. 1. Microporous membranes are used in a variety of applications, including filtration of aqueous and organic solutions, and ionic diffusion and separation in batteries. Hydrophobic microporous membranes may be used as barriers, for example in rainwear, in salt water desalinators, air filtration for clean rooms and in medical applications such as drapes, gowns, and breathable dressings for wounds. Hydrophobicity prevents wetting of the membrane by water in its liquid form, while the microporous structure provides permeability to water vapors and other gasses.

In the production of microporous membranes, different pore sizes may be obtained by changing membrane formulation and processing parameters. Prior methods for micropore formation in membranes include the formation of microcracks on specific crystallizable polymer films, as described for example in U.S. Pat. Nos. 4,187,390 and 4,194,041. These patents disclose that controlled biaxial stretching of a crystallizable polymer, polytetrafluoroethylene, during film formation results in a mesh of modules interconnected by fine fibrils. U.S. Pat. No. 3,679,540 describes the formation of cracks on a film by cold stretching of the elastic polymer film. A subsequent series of hot and cold stretches form the micropores, which are then heat set.

Other methods of micropore formation include the leaching of microparticles from a heterogenous blend, and phase separation. Several types of different phase separation techniques have been developed. For example, U.S. Pat. No. 4,247,498 describes a process in which micropores are formed by first blending polymers and compatible liquid solvents at high temperature then cooling the resulting solution under non-equilibrium thermodynamic conditions. In the first stage of cooling, a liquid-liquid phase separation first occurs, where compatible liquid droplets are surrounded by liquid polymer. Upon further cooling, a solid-liquid phase separation occurs. The solvent is then washed out of the polymer network and dried, yielding a microporous membrane.

A radiation curing process is described in U.S. Pat. No. 4,466,931. A mixture of reactive acrylated oligomers and monomers are dissolved in a suitable solvent/non-solvent mixture. Exposure of the homogenous solution to ultra violet or electron beam irradiation initiates a polymerization process. This leads to a phase separation between insoluble, growing polymer chains and the solvent/non-solvent mixture, resulting in the formation of micropores after solvent removal. While these membranes, and their methods of formation are suitable for some uses, there remains a need for new microporous membranes with good flow rates and advantageous mechanical properties.

SUMMARY OF THE INVENTION

The above-mentioned and other problems and deficiencies of the prior art are overcome or alleviated by the microporous membrane of the present invention. In the method of the present invention, the microporous membrane is formed by first blending a polymer and an antioxdant with a compatible high-boiling point solvent at an elevated temperature, then adding a radiation curable system. A film is then formed from the solution. In the first stage of curing the film is irradiated, initiating a polymeric reaction that results in a phase separation between the growing polymeric chains and the solvent, with the concomitant formation of small aggregates (microsphereulites) linked to the polymeric chain structure. In the second stage of curing, the film is cooled, thereby inducing a thermal phase separation of the polymer from the solvent, and creating a network of micropores. The microsphereulites formed in the first stage of curing act as nucleating agents for the formation of pores in the second stage. Thus, the polymeric chains and microsphereulites formed by ultra violet irradiation serve as nucleating agents in the formation of the porous structure provided by thermal phase separation. Finally, the solvent is washed from the film, the film is biaxially stretched to achieve the desired pore size and the film is heat set.

The above-discussed and other features and advantages of the present invention will be appreciated and understood by those skilled in the art from the following detailed description and drawings.

BRIEF DESCRIPTION OF THE DRAWINGS

Referring now to the several FIGURES, wherein like elements are numbered alike.

DESCRIPTION OF THE PREFERRED EMBODIMENT

Figure 1:
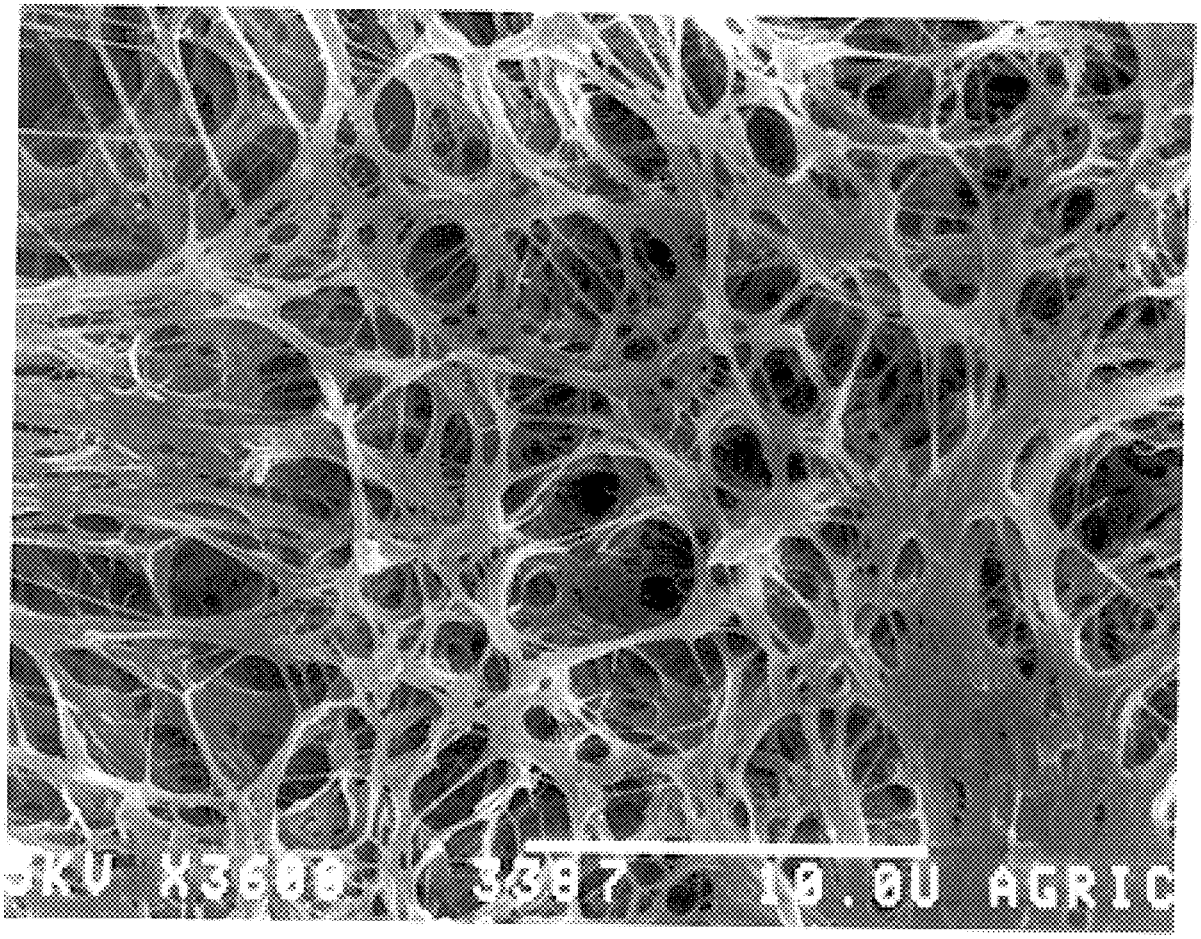
FIG. 1 is a scanning electron micrograph showing the prior art porous structure of a microporous membrane.

The microporous membrane of the present invention is formed by first blending a polymer with a compatible high-boiling point solvent (the "pore-creator" solvent) at an elevated temperature, then adding an antioxidant. A radiation-curable system, comprising a radiation-curable monomer and a solvent, is then added and the solution is well-mixed. A film is next formed from the resulting solution. In the first stage of curing the film is irradiated, initiating a polymeric reaction of the radiation-curable agent that results in a phase separation between the growing polymeric chains and the solvent, with the concomitant formation of small aggregates (microsphereulites) linked to the polymer structure. In the second stage of curing, the film is cooled, thereby inducing a thermal phase separation of the polymer from the solvent, and creating a network of micropores. The microsphereulites formed in the first stage act as nucleating agents for the formation of pores in the second stage. Finally, the pore-creating solvent is washed from the film with a higher volatility solvent, the film is biaxially stretched to achieve the desired pore size, and the film is heat set.

Appropriate polymers and pore-creating solvents for use in this invention are well-known in the art. Preferably, the polymer is a polyolefin. Most preferably, the polymer is a linear low density polyethylene, a high density polyethylene or a polypropylene. A combination blend of these polyolefins may also be used. While polyolefins are preferred, any polymer suitable for membrane formation may be usable in the practice of the present invention.

Preferably, the pore-creator solvent is mineral oil or fatty acid esters. The pore creator solvent or solvents is mixed with the polymer to create a homogenous solution at elevated temperature. By cooling the system results in a phase separation between the polymer chains and the pore creator solvent. The pore creator solvent causes a sponge-like precipitation of the polymer, the void spaces of the sponge being filled with the pore creator solvent. Upon washing out the pore creator solvent the porous structure of the microporous membrane is obtained.

The boiling point of the solvent must be high, and must dissolve the polymers completely, thereby forming a homogenous solution. The preferred boiling point range is from about 100° C. to about 200° C. The most preferred boiling point range is from about 140° C. to about 180° C. Preferred high-boiling point solvents include, but are not limited to, mineral oil and fatty acid esters such as dioctyl phthalate, dioctyl adipate, dibutyl phthalate and the like.

The mechanical and flow properties of the final membrane may be controlled by formulation parameters such as selection of the polymer, the ratio between the polymer and the solvent, the selection of radiation-curable agents and the concentration of radiation-curable agent in solution. Generally, the higher the polymer concentration in solution, the lower the flow rate of the finished membrane. The preferred polymer concentration is in the range from about 10 percent to about 60 percent by weight of the polymer and pore creating solvent together. The most preferred polymer concentration is in the range from about 17 percent to about 40 percent by weight of the polymer/pore creating solvent. Concentrations lower than about 17 percent result in membranes with low tensile strength. Concentrations higher than about 40 percent result in membranes with significantly decreased flow through the membrane.

Use of an antioxidant is preferred in the formulation of the present invention. While any appropriate antioxidant may be used in the practice of the present invention, the preferred antioxdant is a hindered phenol such as, IRGANOX 1076 available from Ciba-Geigy Corp. The antioxidant is added to the homogenous polymer/pore creator solvent mixture described above. It is present in the amount of about 0.5 percent by weight of the polymer/pore creator solvent mixture.

Appropriate radiation-curable systems must be composed of compounds stable at elevated temperatures and possessing high boiling points. The system comprises a radiation-curable agent, a solvent, and a photoinitiator. The preferred radiation curable agents include, but are not limited to, multifunctional acrylated monomers such as polyethyleneglycol diacrylate, propoxylated neopentyl glycol diacrylate, glyceryl propoxy triacrylate, dipentaerythritol, pentaacrylate and the like, and acrylated oligomers such as aromatic urethane acrylates, aliphatic urethane acrylates, polybutadiene acrylates and the like. Importantly, the polymer, solvents and radiation-curable compound must be selected so as to form a homogenous solution at elevated temperatures. Any phase separation prior to curing renders the method inoperative.

For irradiation by ultraviolet light, a photoinitator is added to the radiation-curable agents, the preferred photoinitiator being benzildimethyl ketal. A small amount of ketal is used, preferably about 0.5 percent by weight of the radiation curable monomer and solvent. Preferably, the radiation-curable system comprises a solution of dioctyl adipate containing 10 percent by weight of the acrylate and dioctyl adipate together and benzildimethyl ketal, in the amount of about 0.5 percent by weight of acrylate and dioctyl adipate, mixed at room temperature.

Appropriate selection of the ratio between polymer/solvent system and the radiation curable system is particularly important. The ratio must be chosen so that the solubility of the radiation curable system in the polymer/solvent solution is limited. This is because in the first stage of curing, irradiation results in the formation of microsphereulites, which serve as nucleating agents in the second stage of curing. The microsphereulites may also serve as internal reinforcement for the membrane.

The radiation curable system is pre-heated before addition to the polymer/ pore creator solvent system. After addition, the two systems are thoroughly mixed to provide a homogenous solution. The solution may then be formed into a film by any appropriate method known in the art, for example by coating, casting or blowing, and then cured.

The first stage of curing, irradiation, may be accomplished by ultraviolet light irradiation or by electron beam irradiation. No photoinitiator is required when using electron beam irradiation. In the presence of ultraviolet light, the photoinitiator initiates polymerization of the radiation-curable monomer. The growth of polymeric chains of the radiation-curable components causes a phase separation wherein small aggregates (microsphereulites) are linked to the polymers still in solution. Generally, polymerization is complete within two to three seconds.

In the second stage of curing, the film is cooled, thereby inducing a thermal phase separation of the polymer from the high boiling point solvent. This creates a network of micropores. At this stage, an opaque form is observed. Different types of polymers require different cooling conditions. For example, linear low density polyethylene collapses if cooling after film formation is too fast, while high density polyethylene needs to be cooled immediately after film formation.

The remaining steps in the preparation of the microporous membrane are well-known to those skilled in the art. The pore-creating solvent is washed from the micropores by a higher volatility solvent, for example, acetone, trichloroethylene, hexane and the like. The membrane is dried, and then biaxially stretched to achieve the desired pore size. The microsphereulites spread throughout the polyolefin matrix improve micropore formation during the stretching process. The membranes are heat annealed in an oven.

The mechanical properties of the finished membrane may be affected by the polyolefin used, the ratio of polymer to solvent, the radiation-curable agent used, and the concentration of radiation-curable agent in solution. The flow and mechanical properties of the finished membrane may be affected by, for example, the temperature at which the solution is prepared, the temperature at which the membrane is produced by casting, by coating or by blowing techniques, the rate of cooling the irradiated film, and the stretching conditions, among others. Flow rate, which is dependent on pore size, tortuosity and membrane thickness is determined by both formulation and process parameters. For example, higher polymer concentrations result in lower flow rates.

Articles from the present invention may be formed by laminating membranes of the present invention to, for example, woven or non-woven fabrics. Preferably, the membranes arc laminated to woven fabrics using a spraying glue.

The following examples are intended to be illustrative of the present invention without being limiting.

Materials and Test Methods

Linear low density polyethylene (LLDPE), having a density of 0.918 g/cm$^3$, a melt flow index of 1.0 (as measured according to ASTM D1238), and a softening point of 100° C. (as measured according to ASTM D1525) was obtained as Exxon's LL1001 XV. High density polyethylene (HDPE) having a density of 0.945 g/cm$^3$ and a melt flow index of >0.1 was obtained as BASF's Lupolen 4261 A. Polypropylene (PP) was obtained as Carmel Olefin's Capilene E50E. Glyceryl propoxy triacrylate (GPTA) was obtained as Sartomer's C9020. Polyethylene glycol diacrylate (PEGDA) was obtained as Sartomer's C-344. Dipentaerytritol pentaacrylate (DPEPA) was obtained as Sartomer's SR399. Tripropylene glycol diacrylate (TPGDA) was obtained as Cray Valey's C-306. Aromatic urethane acrylate oligomer (Aromatic UAO) was obtained as Cray Valey's CN 972. Aliphatic urethane acrylate oligomer was obtained as Cray Valey's CN-945 A60. Polybutadiene acrylate was obtained as Cray Valey's CN 300. Dibenzil ketal (KB1) was obtained as Fratelli Lamberti's Esacure KB1. A hindered phenol antioxidant was obtained as Ciba Geigy's IRGANOX 1076.

Air flow (AF) units are expressed in liters of air penetrating a 10 cm$^2$ area of membrane at 0.1 atmospheres pressure for 1 minute (liter per 10 cm$^2$ per minute at 0.1 atmospheres). The moisture vapor transmission (MVTR) was measured using ASTM 96. The membrane was sealed in a vessel in which the weight of water was measured. The units are expressed as loss of water vapors in grams passing through a 1 m$^2$ area of membrane during a 24-hour period at 50% relative humidity (g per meter per 24 hr.). Water breakthrough is expressed in atmospheres.

General Procedure

In the general procedure for small-scale preparation of the microporous membranes of the present invention, a polymer is mixed with a high-boiling solvent at a temperature of 140° C. To the homogenous solution, about 0.5 percent (by weight) of IRGANOX 1076 is added, and dissolved by mixing. A radiation curable solution is prepared, containing radiation curable agent and photoinitiator in DOA. The preheated (80° C.) radiation-curable system is added to the homogenous polymer solution, and the resulting solution mixed until it is also homogenous, usually about two to three minutes. The solution is then coated on a heated (140° C. for LLDPE and 170° C. for PP and HDPE) glass plate located on an electrical hot plate, using a heated doctor blade knife. The glass plate is then removed from the hot plate and placed on a conveyer, rotating at about 10 m/min, and immediately exposed to a Hanovia 200 Watt/cm$^2$ ultraviolet lamp with measured irradiation of 450 mj/cm$^2$. After exposure for 2–3 seconds, the solution is allowed to cool at room temperature on the glass plate for LLDPE, and immediately quenched in a water bath for PP and HDPE. During cooling, the coating becomes opaque, due to phase separation. When the plate reaches 35° C., the solid coating is released from the glass plate and washed with a volatile solvent such as acetone, freon or tetrachloroethylene until the pore creator solvent is completely removed, thereby yielding a white membrane. The membrane is dried at room temperature, and then biaxially stretched on a frame to 50–100 percent of its original size. The membrane is then annealed in an oven (50° C. for 15 minutes for LLDPE and 80° C. for 15 minutes for PP and HDPE) and tested for flow properties (air flow properties and moisture vapor transmission) and water breakthrough.

EXAMPLES

The data in Table 1 show the effect of varying the quantity of polymer on the physical properties of the microporous membrane of this invention. Samples 1–4 were prepared as described below and according to the general procedure described in detail in Example 1. Results are listed in Table 1.

Example 1

Seventeen g of LLDPE was blended with 83 g of mineral oil at a temperature of 140° C. When the mixture became homogenous, 5 g of a preheated (80° C.) radiation curable solution was added and well-stirred. This solution contained 10 g GPTA, 0.5 g photoinitiator, and 90 g DOA. The solutions were mixed for 5 minutes, and coated on a heated glass plate (120° C.), located on an electrical hot plate, using a heated doctor blade knife. The glass plate with the coated solution was removed from the hot plate and located on a conveyer belt, which exposed the coated solution to a U.V. lamp—200 Watt/cm. The exposure intensity was 450 mj/cm$^2$. After exposure, the solution was slowly cooled at room temperature on the glass plate. During cooling the coating turned opaque due to the fact that phase separation occurred. At 35° C. the solid coating was released from the glass plate and washed in acetone. A white membrane was formed. This membrane was dried at room temperature. After drying the membrane was biaxially stretched on a frame to 50% to 100% of its original size. It was set in an oven at 50° C. for 15 minutes, and tested for AF, MVTR, and WBT. The results are summarized in Table 1.

Example 2

A blend of 22 g LLDPE and 78 g mineral oil was prepared, in the same way as for Example 1, using the same radiation curable solution. The results are summarized in Table 1.

Example 3

A blend of 30 g LLDPE and 70 g mineral oil was prepared in the same way as for Example 1, using the same radiation curable solution. The results are summarized in Table 1.

Example 4

A blend of 40 g LLDPE and 60 g mineral oil was prepared in the same way as for Example 1, using the same radiation curable solution. The results are summarized in Table 1.

TABLE 1

| Sample | AF[1] | MVTR[2] | WBT[3] |
|---|---|---|---|
| 1 | 7.5 | 1100 | 2.8 |
| 2 | 6.2 | 960 | 3.5 |
| 3 | 2.2 | 920 | 5.5 |
| 4 | 0.5 | 760 | >6.0 |

[1]AF—Air flow, liter per 10 cm$^2$ per min at 0.1 atmospheres
[2]MVTR—Moisture vapor transmission, g per m per 24 hr at 20° C., 50% relative humidity
[3]WBT—Water breakthrough, atmospheres As is obvious from inspection of Table 1, that by increasing the percent of solids, the total void volume of a defined thickness of microporous membrane decreases. The air flow therefore drops significantly and resistance to water pressure (WBT) increases at high solids percentage. The effect of solids percentage is less significant on vapor transmission. The mechanisms of vapor and air permeation through porous bulk differ. The inhibition of vapor permeation is caused by a thin water layer that might be developed on the surface of the membrane and by adsorption of vapor molecules to the porous rolls. Such effects are not observed with the air permeation.

The data in Table 2 show the effect of various radiation-curable agents on the properties of the microporous membrane of this invention. The same general was used as in Example 1.

Example 5

A blend of 25 g LLDPE, 40 g mineral oil and 35 g DOA was prepared using the membrane processing conditions of Example 1. The results are summarized in Table 2.

Example 6

A blend of 25 g LLDPE, 40 g mineral oil and 35 g DOA was prepared. To this mixture, 5 g of preheated (80° C.) solution containing 10 g PEGDA, 0.5 g of photoinitiator, and 90 g DOA was added. The membrane was prepared as described in Example 1. The results are summarized in Table 2.

Example 7

To a blend of 25 g LLDPE, 40 g mineral oil and 35 g DOA, 5 g radiation curable solution containing 25 g C GPTA, 1.25 g photoinitiator, and 75 g DOA was added, using the same conditions as described in Example 1. Table 2 summarizes the results.

Example 8

To a blend of 25 g LLDPE, 40 g mineral oil and 35 g DOA, 5 g radiation curable solution, containing 12 g DPEPA, 82 g DOA, and 0.6 g photoinitiator was added. The membrane was prepared as described in Example 1. The results are summarized in Table 2.

TABLE 2

| Sample | AF[1] | MVTR[2] | WBT[3] |
|---|---|---|---|
| 5 | 5.1 | 1050 | 4.0 |
| 6 | 6.5 | 1220 | 3.5 |
| 7 | 7.1 | 1250 | 3.0 |
| 8 | 6.3 | 1150 | 3.5 |

[1]AF—Air flow, liter per 10 cm$^2$ per min at 0.1 atmospheres
[2]MVTR—Moisture vapor transmission, g per m per 24 hr at 20° C., 50% relative humidity
[3]WBT—Water breakthrough, atmospheres As the data in Table 2 indicate, the addition of different types of radiation-curable agents and UV curing increases air flow and vapor transmission. This is seen upon comparison of Example 5 (no radiation curable agent) with Examples 6, 7, and 8 (radiation-curable agents present).

The data in Table 3 also show the effect of varying the radiation curable oligomers on the properties of the microporous membrane of the present invention. The same general procedure was followed, using 20 g of LLDPE in 62 g of mineral oil. To this mixture, 5 g of the radiation curable system was added. The results are summarized in Table 3.

Example 9

A blend of 20 g LLDPE and 62 g mineral oil was prepared. To this mixture 5 g of preheated (80° C.) radiation curable solution, containing 3 g aromatic UAO, 1.5 g TPGDA, 0.8 g photoinitiator, and 14 g DOA, was added. The membrane was prepared as described in Example 1. The results are summarized in Table 3.

Example 10

To a blend of 20 g LLDPE and 62 g mineral oil, 5 g of a radiation curable solution containing 3.5 g of aliphatic urethane acrylate oligomer (CN-945 A60 from Cray Valey), 0.8 g photoinitiator, and 12 g DOA was added. The membrane was prepared as described in Example 1. The results are summarized in Table 3.

Example 11

To a blend of 20 g LLDPE and 62 g mineral oil, 5 g of radiation curable solution containing 3.5 g polybutadiene acrylate, 0.8 g photoinitiator and 12 g DOA was added. The membrane was prepared as described in Example 1. The results are summarized in Table 3.

TABLE 3

| Sample | AF[1] | MVTR[2] | WBT[3] |
|---|---|---|---|
| 9 | 6.1 | 1020 | 4.5 |
| 10 | 6.5 | 1100 | 4.5 |
| 11 | 4.3 | 880 | 5.5 |

[1]AF—Air flow, liter per 10 cm$^2$ per min at 0.1 atmospheres
[2]MVTR—Moisture vapor transmission, g per m per 24 hr at 20° C., 50% relative humidity
[3]WBT—Water breakthrough, atmospheres As the data in Table 3 show, the addition of urethane acrylated oligomers (Examples 9 and 10) to the basic formulation of the microporous membrane provides better flow permeation properties than the polybutadiene acrylate oligomer (Example 11). The polybutadiene acrylate oligomer causes a partial collapse of the microporous structure.

The data in Table 4 show the effect of varying the polyethylene composition the microporous membranes of the present invention. The radiation curable system consisted of 10 g of GPTA, 90 g of DOA and 0.5 g of benzyl dimethyl ketal. Importantly, both HDPE and PP require faster cooling than LLDPE. Thus, the same general procedure was followed as described above, except that the film was spread on a glass plate heated to 180° C., and during phase two of the curing process, the thermally-induced phase separation, required faster cooling in a water bath maintained at room temperature, rather than cooling at room temperature. Furthermore, the membrane was biaxially stretched to 20 to 40 percent of its original size.

Example 12

20 g HDPE was blended with 40 g mineral oil and 35 g DOA. To this blend 5 g of a radiation curable solution containing 10 g GPTA, 0.5 g photoinitiator and 90 g DOA was added. The solutions were mixed for 5 minutes and coated on a heated glass plate using a heated doctor knife blade. The glass plate was irradiated with an ultra violet lamp and cooled in a water bath to room temperature. It was released from glass plate, washed in acetone, and dried at room temperature. After drying the membrane was biaxial stretched on a frame to 20% to 40% of its original size. It was set in an oven at 80° C. for 15 minutes. The membrane was tested for AF, MVTR, and WBT. The results are summarized in Table 4.

Example 13

To a blend of 30 g PP, 30 g mineral oil and 30 g DOA, 5 g of radiation curable solution containing 10 g GPTA, 0.5 g photoinitiator and 90 g DOA was added. The membrane preparation is described in Example 9. The results are summarized in Table 4.

TABLE 4

| Sample | AF[1] | MVTR[2] | WBT[3] |
|--------|-------|---------|--------|
| 12 | 4.1 | 1200 | 5.5 |
| 13 | 3.2 | 950 | 4.0 |

[1]AF—Air flow, liter per 10 cm² per min at 0.1 atmospheres
[2]MVTR—Moisture vapor transmission, g per m per 24 hr at 20° C., 50% relative humidity
[3]WBT—Water breakthrough, atmospheres As the data in Table 4 indicate, microporous membranes with the desired physical characteristics can be prepared using both high density polyethylene and polypropylene.

Pilot and Production-Scale Manufacture

Samples of the microporous membrane of the present invention may be prepared using pilot and production techniques well known in the art. Generally, on this scale, preparation of the microporous membranes of this invention comprised the separate steps of first, preparing compounded pellets via compounders; extruding the pellets through dies; shaping into films by either casting or blowing; washing, and drying, yielding white membranes; and finally stretching and setting in an oven. The final products were then laminated to a textile fabric using a sprayed glue.

For the pilot experiments, formulations without radiation-curable agents were used, and there was no ultra violet lamp on the pilot equipment. The pilot experiments show that there is good correlation between values of the laboratory membranes without radiation-curable systems (Example 5) and the pilot-prepared membranes without the radiation-curable agents (Examples 14–16). It is expected that the values of the laboratory membranes in which radiation curable agents are included will also correlate with the values of the pilot-prepared membranes with radiation-curable solutions added. The physical properties of three examples produced on a pilot line are summarized in Table 5.

Example 14

LLDPE membranes were produced on a pilot line using 30% polymer solutions in mineral oil. Physical properties are summarized in Table 5.

Example 15

HDPE membranes were produced on a small pilot extruder, using a solution of 33 percent polymer in mineral oil. Physical properties are summarized in Table 5.

Example 16

PP membranes were prepared on the same extruder as Example 15 from a 55 percent polymer solution in oil. Physical properties are summarized in Table 5.

TABLE 5

| Sample | AF[1] | MVTR[2] | WBT[3] | Observations |
|--------|-------|---------|--------|--------------|
| 14 | 2.5 | 1100 | >6.0 | 50μ thick Soft and stretchable Good for textile applications |
| 15 | 3.0 | 960 | >6.0 | High tensile strength Flexible, but not soft |
| 16 | 1.8 | 850 | 4.0 | 90μ thick stiffer than LLDPE samples |

Figure 2:
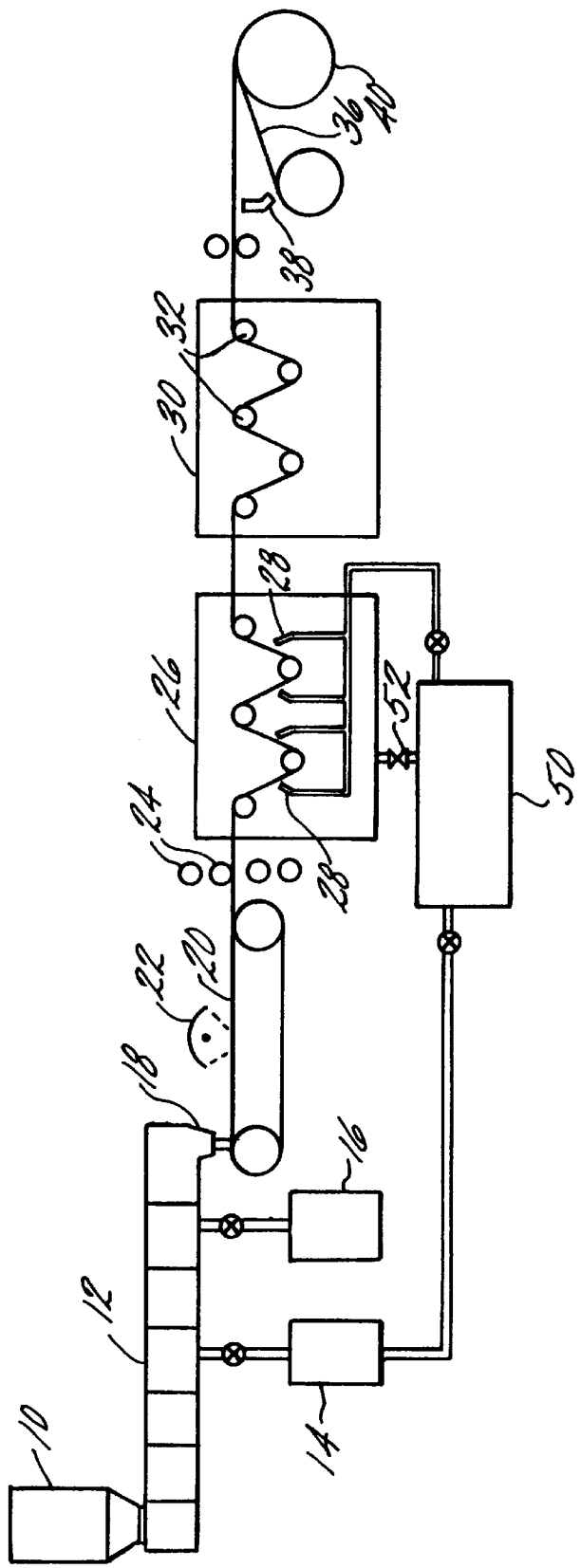
FIG. 2 is a schematic drawing of a production line for the manufacture of the microporous membranes of the present invention.

[1]AF—Air Flow, liter/10 cm2*min at 0.1 atmospheres
[2]MVTR—Moisture vapor transmission, g/m*24 hr at 20° C., 50% relative humidity
[3]WBT—Water breakthrough, atmospheres Referring now to FIG. 2, production-scale manufacture of the microporous membranes of the present invention may be accomplished via the apparatus shown. Generally, the process comprises the steps of preparing compounded pellets; extruding the pellets through dies and shaping into films by either casting or blowing; washing; stretching and setting; and finally laminating to a textile fabric.

Specifically, the selected polyethylene is fed through hopper 10 into a compounder/extruder 12. The preheated solvents are added to the compounder/extruder 12 from attached reservoir 14 via a pump. The polyethylene and solvent are then mixed at elevated temperatures. Preheated radiation-curable agents are then pumped into the compounder/extruder 12 from a second reservoir 16. The resulting solution is mixed until it is homogenous, and then pushed toward slot die 18. From the die 18, the film is cast on an endless rotating belt 20, and irradiated from a suitable source 22. The irradiated film is cooled by chilling rolls 24, washed in a bath 26 using spray nozzles 28 and dried in oven 30. Oven 30 also contains rolls 32 and a tenter frame for monoaxial or biaxial stretching of the membrane. The membrane is then heat set in oven 30 to reduce shrinkage. A support 36 may be laminated to the membrane using a spraying glue means 38. The laminated membrane is then rewound onto roll 40.

Preferably, the above production process further comprises a distillation step for recovery of high-boiling and other solvents. Thus, a means for distillation is attached whereby contaminated solvent is allowed into the distilling apparatus 50 via valve 52. After distillation the high-boiling point solvent may be returned to reservoir 14, and reused. The washing solvent may be returned to the spraying nozzles 28 and reused.

Where the speed of each process step varies, production may proceed in discrete steps rather than on-line. For example, after the coating and cooling step, the membrane could be wound and washed later. After the washing and drying step, the membrane could again be wound and then stretched and laminated later.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process of producing a microporous membrane comprising:

creating a homogenous solution comprising at least one polymer, at least one solvent, and an ultraviolet or electron beam radiation curable system;

forming a film from said homogenous solution;

inducing microsphereulite formation within said film by ultraviolet or electron beam irradiation of said film; and subsequently cooling said film so as to induce a thermal phase separation, thereby yielding a microporous membrane.

2. The process of producing a microporous membrane of claim 1, wherein
said homogenous solution is formed by mixing a homogenous mixture of said polymer and said at least one solvent at elevated temperature with said radiation curable system, said radiation curable system being pre-heated.

3. The process of producing a microporous membrane of claim 2, wherein
said elevated temperature is in the range from about 100° C. to about 200° C.

4. The process of producing a microporous membrane of claim 2, wherein
said radiation-curable system is pre-heated to a temperature of about 80° C.

5. The process of producing a microporous membrane of claim 1, wherein
said polymer is a polyolefin polymer.

6. The process of producing a microporous membrane of claim 5, wherein
said polyolefin polymer is selected from the group consisting of low density polyethylene, high density polyethylene, and polypropylene.

7. The process of producing a microporous membrane of claim 6, wherein
said polymers are present in the range of from about 10 percent to about 60 percent of said homogenous solution by weight.

8. The process of producing a microporous membrane of claim 1, wherein
said solvent is selected from a group consisting of high-boiling point solvents, said high boiling points being in the range from about 100° C. to about 200° C.

9. The process of producing a microporous membrane of claim 8, wherein
said solvents are selected from a group consisting of mineral oil and fatty acid esters.

10. The process of producing a microporous membrane of claim 1, wherein
said radiation curable system is comprises a photoinitator, a solvent, and at least one compound selected from the group consisting of ultraviolet radiation curable monomers and ultraviolet radiation curable oligomers.

11. The process of producing a microporous membrane of claim 10, wherein
said at least one compound is an ultraviolet light curable acrylate.

12. The process of producing a microporous membrane of claim 11, wherein
said at least one compound is selected from the group consisting of glyceryl propoxy triacrylate, polyethylene glycol diacrylate, dipentaerythritol pentaacrylate, aromatic urethane acrylate oligomer, aliphatic urethane acrylate oligomer, and polybutadiene acrylate.

13. The process of producing a membrane of claim 10, wherein
said photoinitiator is benzyl dimethyl ketal.

14. A process of producing a microporous membrane comprising:
creating a homogenous solution at an elevated temperature above room temperature comprising at least one polyolefin polymer, at least one solvent, and an ultraviolet radiation curable system;

forming a film from said homogenous solution;

inducing microsphereulite formation within said film by ultraviolet irradiation of said film; and subsequently cooling said film so as to induce a thermal phase separation, thereby yielding a microporous membrane.

* * * * *